Dec. 24, 1940.   A. PODEL   2,226,410
CAPPING MACHINE
Filed Jan. 13, 1938   10 Sheets-Sheet 1

INVENTOR.
Abraham Podel
BY Norman T. Holland
his ATTORNEY.

Dec. 24, 1940.  A. PODEL  2,226,410
CAPPING MACHINE
Filed Jan. 13, 1938  10 Sheets-Sheet 2
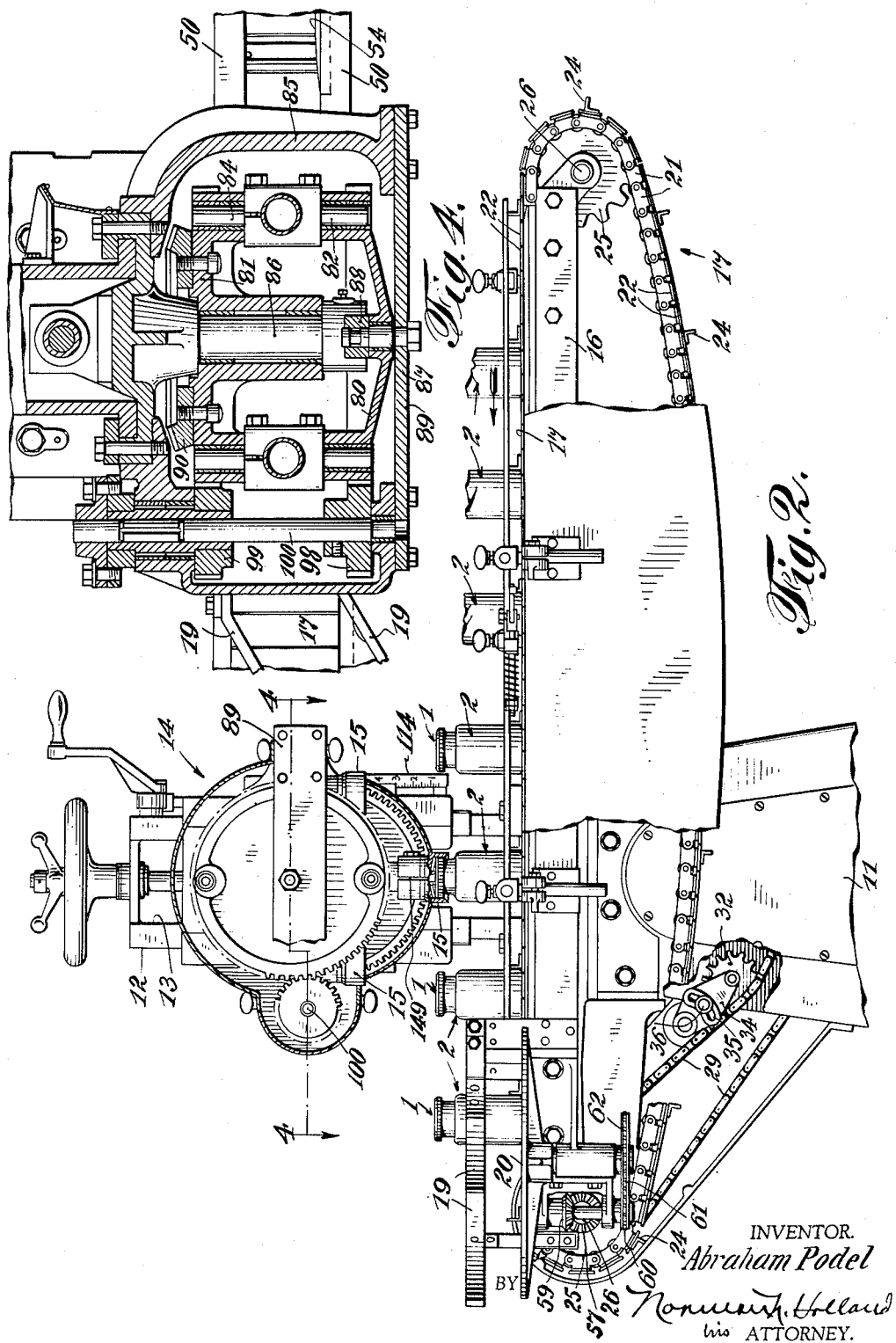
INVENTOR.
Abraham Podel
BY
his ATTORNEY.

Dec. 24, 1940.  A. PODEL  2,226,410
CAPPING MACHINE
Filed Jan. 13, 1938  10 Sheets-Sheet 3

INVENTOR.
Abraham Podel
BY Norman N. Holland
his ATTORNEY.

Dec. 24, 1940.  A. PODEL  2,226,410
CAPPING MACHINE
Filed Jan. 13, 1938  10 Sheets-Sheet 4

INVENTOR.
Abraham Podel
BY Norman J. Holland
his ATTORNEY.

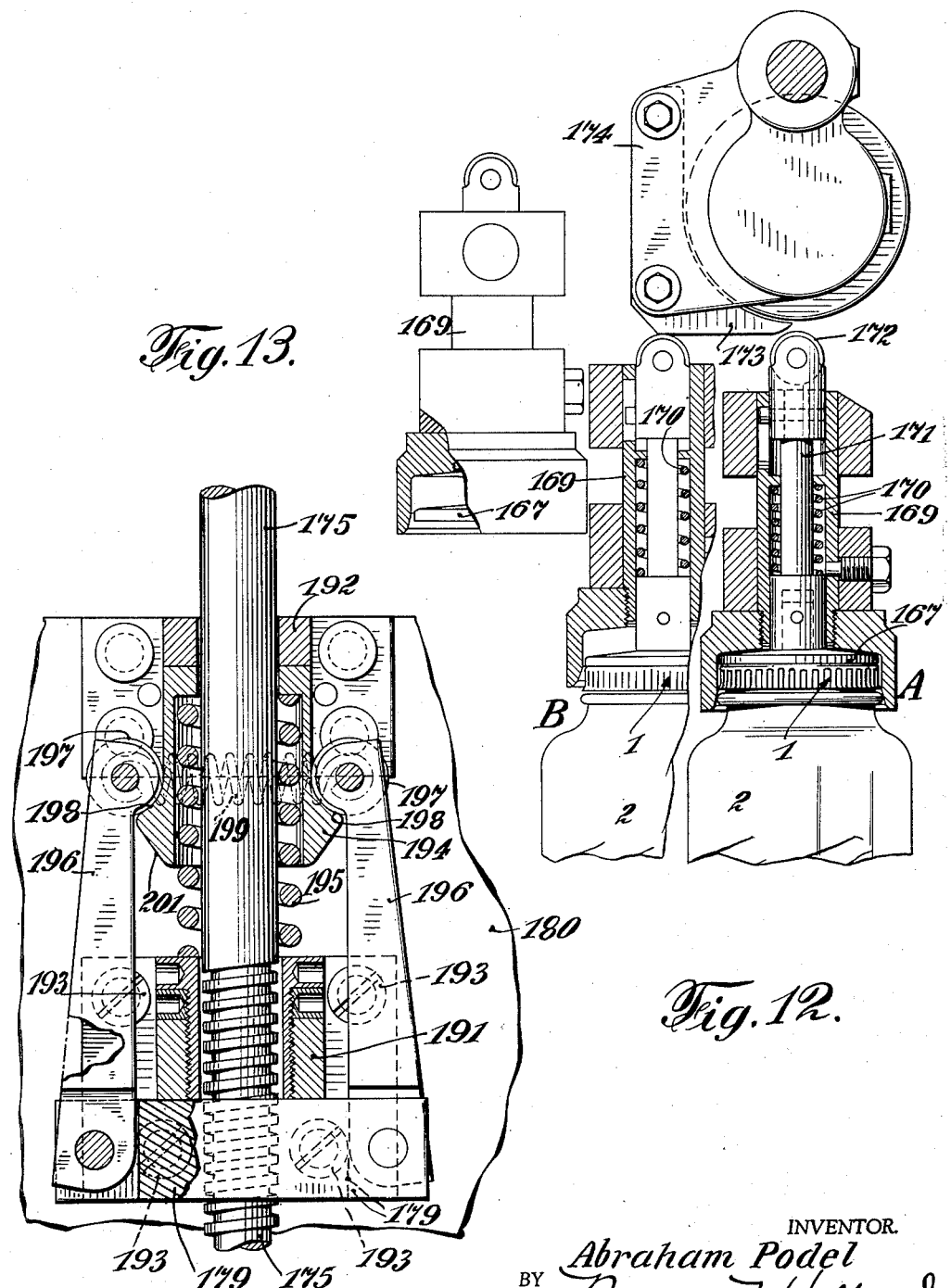

Patented Dec. 24, 1940

2,226,410

UNITED STATES PATENT OFFICE 2,226,410

CAPPING MACHINE

Abraham Podel, New York, N. Y., assignor to Anchor Cap & Closure Corporation, Long Island City, N. Y., a corporation of New York Application January 13, 1938, Serial No. 184,759

23 Claims. (Cl. 226—84)

The present invention relates to sealing machines and more particularly is an improvement over the sealing machine shown in my prior Patent No. 1,634,723, dated July 5, 1927.

The present invention relates to an improved sealing machine adapted to seal containers without stopping the movement of the containers as they are presented to and pass the sealing station. The machine is adapted to be operated continuously without danger of breaking the containers or spilling the contents thereof. Suitable safety devices cause the machine to exert a predetermined amount of sealing pressure in every instance to provide uniformly sealed packages and eliminate undue strains on the operating parts of the machine. The machine is particularly adapted to seal caps which must be crimped or otherwise reformed, but is also adapted to seal caps requiring only downward pressure to seal them to containers.

An object of the present invention is to provide an improved sealing machine adapted to be operated continuously without stopping the movement of the containers as they pass the sealing station.

Another object of the invention is to provide a sealing machine adapted to seal containers rapidly and preferably at a rate of more than one hundred a minute.

Another object of the invention is to provide an improved continuously operated sealing machine having chucks adapted to reform the caps to seal them to the containers.

Another object of the invention is to provide a sealing machine having means for spacing and guiding the containers accurately with respect to the sealing chucks to insure perfect seals and to prevent breakage of the containers.

Another object of the invention is to provide a sealing machine having devices for adjusting the amount of sealing pressure of the chucks to apply uniform sealing pressure to the caps.

Another object of the invention is to provide a sealing machine having a resiliently mounted sealing head adapted to compensate for slight variations in the height of the containers.

Another object of the invention is to provide a sealing machine having a plurality of sealing chucks carried by a sealing head adapted to be raised in the event that a container offers excessive resistance to the sealing chucks.

Another object of the invention is to provide a sealing machine having a sealing head adapted to positively maintain the sealing chucks in downwardly facing position to insure proper engagement and sealing of the caps to the containers and to prevent strains on the chuck connections.

Another object of the invention is to provide a sealing machine having an improved conveyor for delivering containers to the sealing station and a table or platform for resiliently supporting the conveyor at the sealing station to eliminate strains on the conveyor.

Another object of the invention is to provide a sealing machine having a conveyor adapted to cooperate with a rotary discharge or intake disc to increase the operating speed of a machine.

Another object of the invention is to provide a sealing machine which is readily adjustable to accommodate containers varying in height or diameter or having an unusual shape.

A further object of the invention is to provide a sealing machine having a clutch operating lever in a convenient position, but out of the way of operating parts so that it can be operated without interfering with the operating parts.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a fragmentary sectional view, illustrating a package comprising a container and a cap particularly adapted to be sealed to the container by the sealing machine about to be described.

Fig. 2 is a front elevational view illustrating a preferred embodiment of the machine of the present invention;

Fig. 4 is a sectional view taken along the line 4—4 of Fig. 2 illustrating the sealing head;

Fig. 6 is a fragmentary elevational view, partly in section, illustrating a safety device for permitting the sealing head to move upwardly when a container offers excessive resistance to a sealing chuck and particularly when the container is not properly centered with respect to the chuck.

Fig. 6a is a sectional view of the safety device shown in Fig. 6 in another position;

Fig. 12 is a fragmentary front elevational view, partly in section, illustrating an improved sealing chuck;

Fig. 13 is an elevational view illustrating a modified safety device for permitting the sealing head to rise when a container offers excessive resistance to a sealing chuck;

Figure 1:
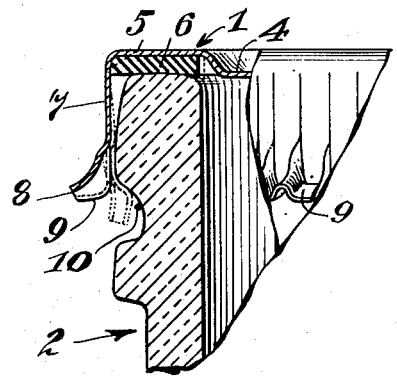

Referring again to the drawings, and more particularly to Fig. 1, there is shown a closure cap 1 which is illustrative of one type of cap adapted to be sealed to a container 2 by the machine about to be described. The cap comprises a cover part 4, having a groove or recess 5 therein for receiving a suitable gasket 6 adapted to be sealed against the rim of the container, and a downwardly depending skirt 7 terminating in an outwardly extending portion 8 having a series of projections or crimps 9 formed therein which are adapted to be set inwardly by the sealing chucks of the machine to engage the underside of a sealing lip or shoulder 10 on the container as shown in dotted lines.

Figure 5:
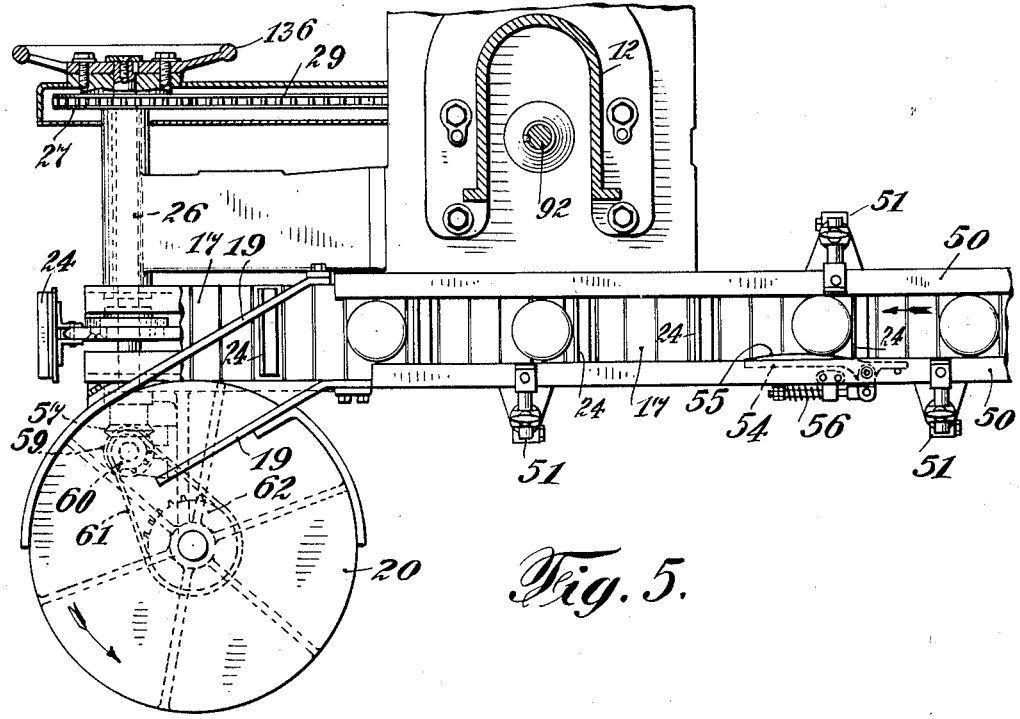
Fig. 5 is a top plan view, partly in section, illustrating a preferred form of conveying mechanism for delivering containers to the sealing machine.

Described generally, a preferred embodiment of the present machine (Figs. 2, 3 and 5) comprises a base 11 adapted to be bolted to the floor or other suitable foundation and having a column 12 extending upwardly from the base for supporting a rotatable sealing head 14 carrying a series of chucks 15 adapted to apply the caps to the containers. Preferably, the sealing head is provided with four chucks, but it will be understood that any other desired number of chucks, for example three, six or eight, can be utilized. The sealing head, as will be described in detail hereafter, is constructed so that the chucks when in engagement with a cap on a container move at the same rate of speed in a lineal direction as the containers to permit sealing of the containers without stopping the movement thereof. A table or platform 16 provided with an anvil beneath the sealing head, is supported by the base 11 and a conveyor 17 travels across the table to present the containers, having caps placed loosely thereon, to the sealing chucks at predetermined intervals. The containers preferably are removed from the conveyor 17 by guide members 19 adapted to place them on a rotating discharge disc 20 mounted at the delivery end of the table. The discharge disc, the conveyor and the sealing head are operatively connected to a suitable source of power and are preferably driven in timed relation with respect to each other. These various mechanisms will now be described in detail.

*The container feeding devices*

Preferably, the conveyor (Figs. 2, 3 and 5) comprises a pair of chains 21 having bars or plates 22 connected thereto provided with spaced cleats or upwardly projecting portions 24 for engaging the containers and delivering them to the sealing head at predetermined intervals. The chains 21 are mounted on suitable sprockets 25 carried by axles 26 at the respective ends of the table 16 and preferably the axle at the discharge end of the table is provided with a sprocket 27 adapted to be rotated by a drive chain 29 operatively connected to the main drive shaft 31 by a sprocket 30. If desired, tension of the drive chain 29 may be adjusted by a sprocket 32 carried by a pivotally mounted bracket 34 having a slot 35 therein adapted to receive a bolt 36 for holding the bracket in various positions of adjustment (Fig. 2).

The conveyor chains 21 preferably are supported by flange members 37 (Fig. 3) at each side of the table and rollers 39 or other friction reducing means are provided on the underside of the conveyor plates 22 which register with a runway 40 formed in the table. At the sealing station the flange members 37 and runway 40 form part of a sealing anvil or block 41 adapted to provide a firm support for the conveyor while the containers are being sealed. The runway 40 for the rollers preferably comprises a plate 42 seated on a bar 44, which, in turn, is seated on a cushion or bed 45 of resilient material such as rubber adapted to yield slightly to prevent excessive strains on the conveyor parts while the sealing chucks are effective. Preferably, the anvil 41 is mounted by a bracket 46 attached to the base 11 of the machine by suitable bolts or the like.

In order to present the containers properly to the sealing chucks, suitable guide bars 50 (Fig. 5) extend longitudinally above the conveyor at each side of the table and are held in place by suitable brackets 51. The brackets 51 are adapted to be raised and lowered with respect to the conveyor to adjust the height of the guide bars 50 with respect to the height of the container being fed. Preferably, the guide bars are raised sufficiently to prevent the containers from toppling over while moving along the conveyor and in this manner accommodate containers of various heights and shapes. The brackets 51 are also adjustable to permit the guide bars to be moved transversely to receive containers varying in diameter and to guide the containers accurately into vertical alignment with the sealing chucks.

In order to present the containers at predetermined intervals with respect to the operation of the chucks, a suitable arm or retarding wiper 54 (Fig. 5) having a portion 55 extending into the path of the containers is pivotally mounted on the table at the container feeding side of the sealing head. The arm 54 preferably is held in container engaging position by a suitable spring 56 or other resilient means adapted to be adjusted to apply any desired tension to retard the movement of a container until a cleat 24 of the conveyor engages the container and forces it past the retarding wiper. This feature is very desirable because it has been found that for large containers the spring must provide greater tension than for smaller containers to position them against the cleats. Likewise, if the tension is too great the retarding wiper has a tendency to tip the containers. In this manner, the containers always abut against the conveyor cleats which are accurately spaced along the conveyor and are moved in a predetermined relation with respect to the chucks, to insure perfect alignment of the containers with respect to the chucks 15 at the sealing station.

After the containers have been sealed, they are guided from the conveyor 17 by the guide members 19 and are delivered to the rotating discharge disc 20 at the delivery end of the machine. Preferably, the disc 20 is rotated by a gear 57 (Figs. 2 and 5) on the conveyor axle 26 through the intermediation of a gear 59, a sprocket 60, a chain 61 and a sprocket 62 connected to the lower end of the shaft carrying the disc 20. It will be understood that a similar disc may be provided at the receiving end of the conveyor which would facilitate placing the containers on the conveyor in the same manner as the discharge disc facilitates their removal.

The sealing mechanism

The present invention contemplates a sealing mechanism (Figs. 2, 3, 4 and 7) which is a substantial improvement over the mechanism illustrated in my prior patent referred to herein. The sealing head can be operated at higher speeds and the chucks are adapted to crimp or reform the caps which they seal to the containers. An advantageous feature of the sealing head is that the chucks are rotated by two rotating members adapted to hold the chucks in vertical position and to impart substantially horizontal linear movement to the chucks during the period while the caps are being sealed. These rotating members are positively driven by suitable gears and do not subject the chuck connections to any strains resulting in loose connections or play between the rotating members which would cause the chucks to be presented out of alignment with the caps being sealed on the containers. A further feature is that the height of the containers can be accurately gauged and the sealing head can be adjusted accordingly to set it at the proper height. In addition to these improvements, a compensating and safety mechanism is provided which releases the sealing head and permits it to move upwardly if a chuck engages a container off center and fails to telescope over the cap. This safety device prevents breakage of the container in such cases and also when containers are too tall to fit properly under the chucks. When such a contingency occurs, the head is raised during the sealing of the oversized container and lowers by gravity after the sealing operation. A detailed description of this safety device follows the description of the operating parts of the sealing head.

The sealing head 14 preferably is provided with four capping chucks 15 (Fig. 7) and all of these are alike whereby a description of one will suffice for all. The chucks comprise a sleeve 65 adapted to be connected to the rotating members as will be described hereafter, a crimping tool 66 connected to the lower end of the sleeve and an anvil member 67 slidable with respect to the sleeve 65 and crimping tool 66 for providing downward pressure on the cover part of the caps by means of a spring member 69 within the sleeve 65. The crimping tool preferably is cup-shaped and has a depending flange 70 provided with cleaning slots 71 at the sides and an annular bevelled surface 72 at the interior lower end for setting the projections 9 of the skirt of the cap downwardly and inwardly. The anvil member 67 has a stem 74 to which a bushing 75 may be attached and the bushing has a flange 76 which limits downward movement of the anvil member 67 within the crimping tool when pressure is exerted by the lower end of the spring 69. The tension of the spring 69 may be controlled by a plug member 77 threaded into the upper end of the sleeve 65.

The chucks are operated by a pair of spaced disc members or spiders 80 and 81 (Figs. 3 and 4) each rotating about an axis parallel to and in vertical alignment with the axis of the other. By connecting the upper ends of the chuck sleeves 65 to the rotating member 80 by suitable trunnions 82 and connecting the lower ends of the chuck sleeves to the other rotating member 81 by trunnions 84, the sleeves are held in a vertical position with the chucks facing downwardly throughout their rotation. In this manner, the chucks can be properly aligned with the caps which are sealed on the containers and move substantially horizontally when they are at the bottom of the rotating discs.

The rotating spiders 80 and 81, for operating the chucks, may be mounted in any suitable manner, but preferably the rotating member 81 is mounted on a shaft or axle 86 secured to a sealing head frame 85 and the rotating member 80 is mounted on a second shaft 87 supported by a bracket 88 secured to the shaft 86 and braced by a member 89 secured to the sealing head frame. The rotating members 80 and 81 preferably are rotated by a bevel gear 90 or the like (Figs. 3 and 4) secured to the rear rotating member 81 and driven by the main drive shaft 31 through the intermediation of a gear 91 on a vertical shaft 92 (Fig. 3) carried by the sealing head frame and a gear 94 at the lower end of the shaft 92 meshing with a gear 95 on the main drive shaft 31. The rotating members 80 and 81 have gear teeth 96 and 97 respectively (Figs. 2, 3 and 4) at their outer peripheries and these mesh respectively with gears 98 and 99 (Fig. 4) mounted on a shaft 100 supported by the sealing head frame. In this manner, the gear teeth 97 of the member 81 rotate the gear 99 to rotate the shaft 100 and the gear 98 which, in turn, meshes with the gear teeth 96 and rotates the front spider member 80. By positively driving the front spider member through the intermediation of gears 96, 97, 98 and 99, the trunnions 82 and 84 and the chuck sleeves 65 do not provide the driving connection and consequently are not subjected to any strains. This prevents the trunnions from being worn or the sleeves from being moved out of vertical alignment. As a consequence, the chucks face downwardly and are always in proper vertical alignment when they engage the caps.

Preferably, the sealing head frame is slidably mounted on a guideway 13 of the column 12 (Figs. 2 and 3) to permit the head to be raised and lowered to accommodate containers of different height. To enable such raising and lowering of the head without disturbing the drive connections (Fig. 3), the vertical shaft 92 has its upper end journaled within a bracket 101 secured to the sealing head frame and has a keyway 102 at its lower end for receiving a key 104 carried by the drive gear 94. The gear 94 is mounted on a bushing 105 secured to the base of the machine so that the gear 94 is always in meshing relation with the gear 95 on the main drive shaft 31. When the sealing head frame is raised or lowered, the keyway permits relative movement of the shaft 92 with respect to the gear 94 without disengagement of any of the gears.

Figure 8:
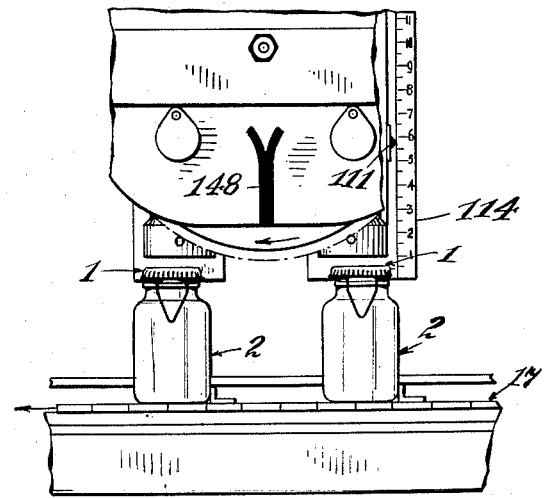
Fig. 8 is an elevational view illustrating the relation of the containers with respect to the sealing chucks prior to and after the sealing operation shown in Fig. 7.
Figure 7:
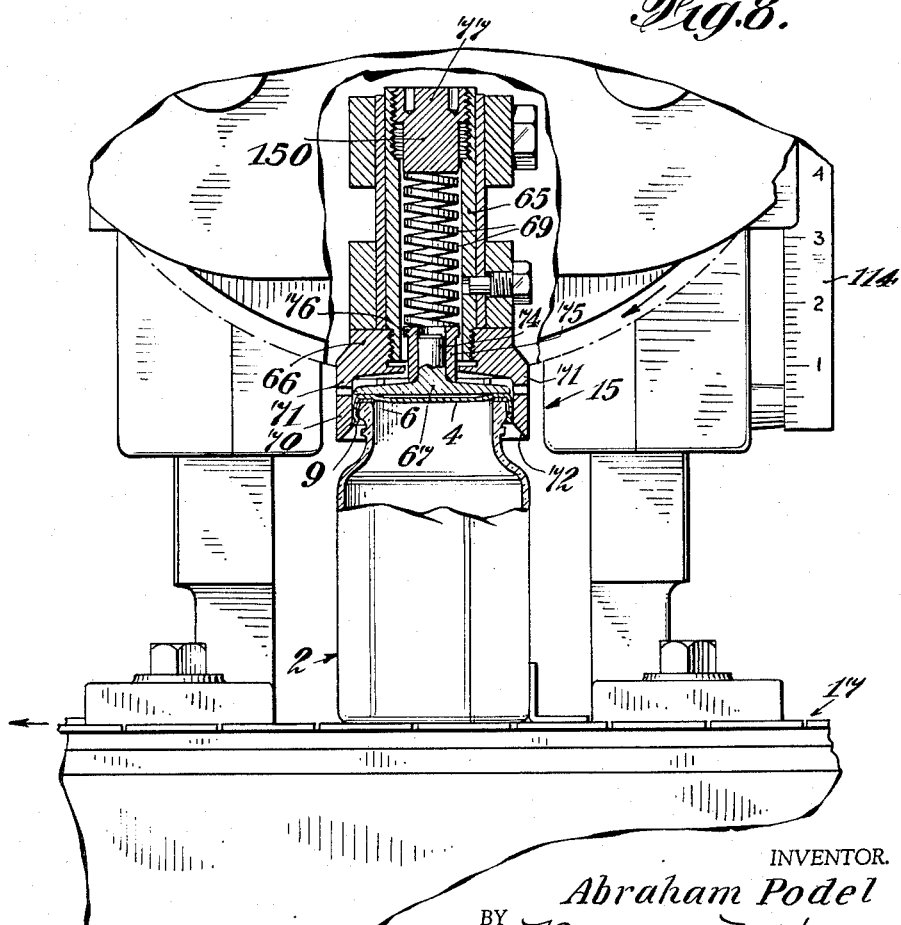
Fig. 7 is an enlarged elevational view, partly in section, illustrating a sealing chuck while a cap is being sealed to a container.

The sealing head frame may be raised or lowered by any suitable means but preferably such means comprise, a threaded shaft 110 extending downwardly from the column 12, a threaded nut or collar 112 for receiving the shaft and supporting the sealing head frame, and a hand wheel 113 for rotating the shaft to raise or lower the sealing head frame. In order to accurately adjust the height of the sealing head, a gauge or scale 114 (Figs. 2, 7 and 8) is provided on one side of the head supporting column 12 and a pointer 111 is provided on the sealing head 14 which indicates the height of the container for which the head is set. By knowing the height of the containers to be sealed, the hand wheel 113 may be turned to raise or lower the head until the scale pointer indicates the height on the scale.

*Sealing head safety mechanism*

A suitable safety mechanism (Figs. 3, 6 and 6a) operatively connects the sealing head frame 85 to the adjusting collar 112 and is designed to permit the sealing head to move upwardly when a chuck engages a container improperly. Another feature of the safety mechanism is to mount the head resiliently and eliminate strains on the sealing tools and breakage of the container if a container is taller than the height for which the machine is set or is off center with respect to the chuck. In such cases, the safety acts as a compensating spring and cooperates with the resilient parts of the supporting anvil 41 of the conveyor table.

To accomplish this, the sealing head frame 85 is slidably mounted in the column 12 so that it can slide freely in a vertical direction and is supported by the height adjusting collar or nut 112 which engages the underside of a bracket 115 secured to the frame 85 and the bracket 115 is preferably locked to the collar 112 to prevent relative upward movement of the sealing head with respect to the containers under normal operating conditions by a suitable latch mechanism about to be described.

The latch mechanism illustrated herein preferably comprises a sleeve 116 secured to the bracket 115 through which the height adjusting shaft 110 extends, a spring 117 telescoped about the sleeve 116, a latch collar 119 for compressing the spring downwardly and a locking collar 120 secured to the upper end of the sleeve for limiting upward movement of the latch collar 119. The latch collar 119 is provided with a shoulder 121 adapted to be engaged by hook-shaped portions 122 of the latch fingers 124 (Figs. 6 and 6a) pivotally mounted on the supporting collar 112 at 125 and held in shoulder engaging position by a suitable spring 126. During normal operation of the chucks, the spring 117 compensates for slight irregularities in the containers and acts as a cushion for the head while the latch fingers 124 lock the collars 112 and 119 together. However, when resistance to the downward movement of the chucks becomes excessive and cannot be compensated for by the chuck springs 69 and the spring 117, the latch collar 119 is forced upwardly to spread the fingers 124 in opposition to the spring 126 and unlock the sealing head from the supporting collar 112 (Fig. 6a). In order to facilitate spreading and unlocking of the fingers 124 to permit upward movement of the frame, the bracket 115 may be provided with cam portions 127 or the like adapted to engage cam portions 128 on the fingers 124. When the oversized or off center container has passed the sealing position, the head is automatically lowered by gravity into its adjusted position and the safety latch fingers 124 re-engage the shoulder 121 of the latch collar 119. The amount of excessive pressure or resistance necessary to cause unlocking of the safety latch can be predetermined by adjusting the tension of the compensating spring 117 and the latch finger retaining spring 126.

*The drive mechanism*

The drive mechanism for operating the present machine preferably comprises a motor 130 or other suitable source of power adapted to be operatively connected by a clutch mechanism 131 to a shaft 132 which operates a train of gears 134 for driving the main drive shaft 31. The main drive shaft 31 rotates the chain sprocket 30 for operating the conveyor 17 and the discharge disc 20, and also rotates the gear 95 for operating the sealing head spiders 80 and 81. In this manner, the conveyor 17, the disc 20 and the sealing head 14 can be operated in a definite predetermined relation with respect to each other.

In order to adjust the relative position of the chucks of the sealing head with the conveyor cleats 24 which present the containers, the clutch shaft 132 is provided with a hand wheel 135 (Fig. 3) for turning over the machine to place the chucks in a desired position. The shaft 26 carrying the sprocket for driving the conveyor 17 is also provided with a hand wheel 136 (Fig. 5) adapted to be turned independently of the sealing head drive whereby the cleats 24 of the conveyor may be placed in a desired position with respect to the chucks.

Figure 3:
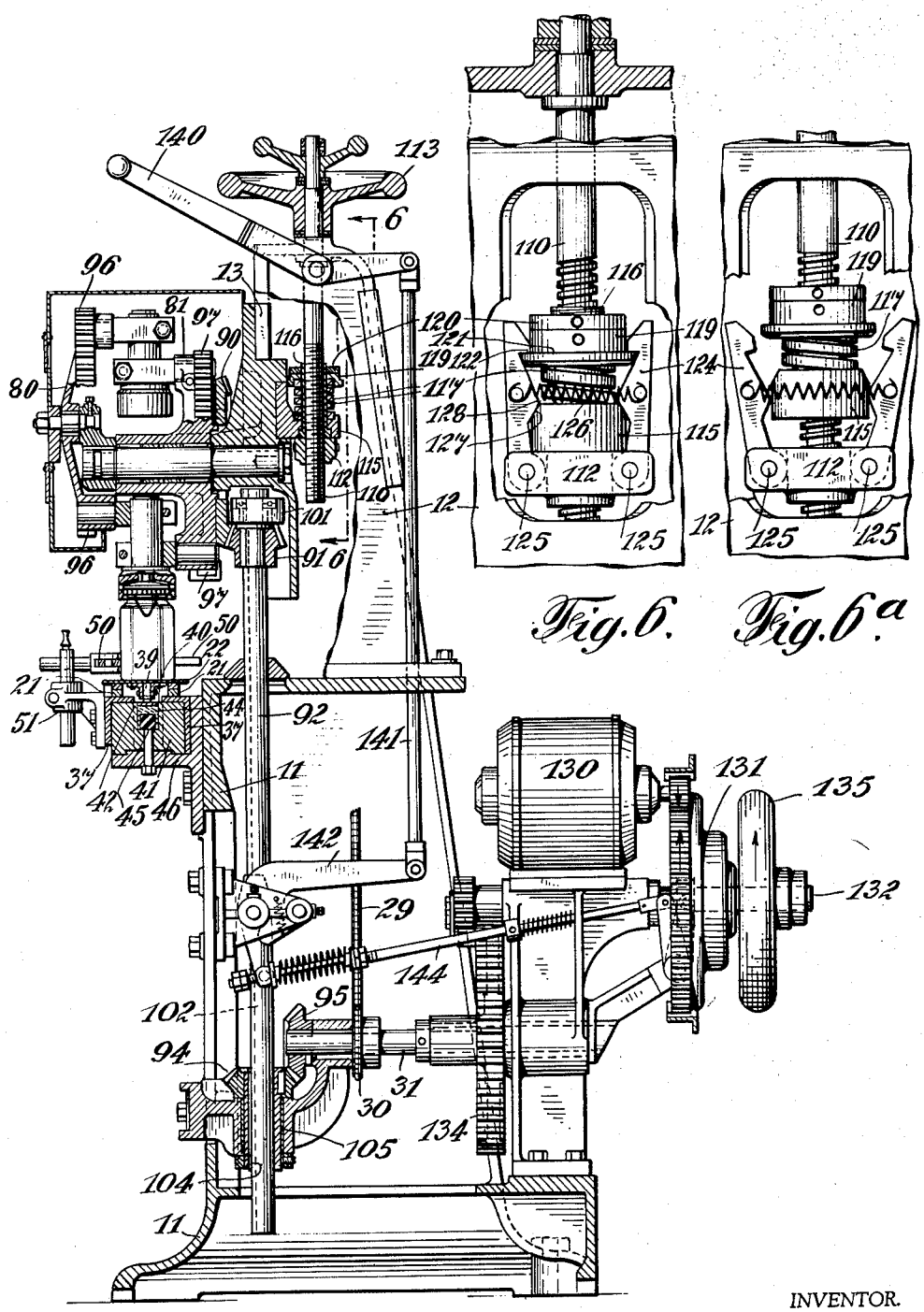
Fig. 3 is a side elevational view, partly in section, of the machine shown in Fig. 2.

Another feature of the above drive mechanism is that the clutch mechanism is operated by a lever 140 pivotally mounted at the upper end of the column 12. Preferably, the lever extends forwardly over the sealing head so that it is within convenient reach of the operator, but at the same time does not interfere with the feeding of containers or the operation of the sealing head. The lever may be operatively connected to the clutch mechanism by a rod 141, a second lever arm 142, and a rod 144 connected to the clutch 131 (Fig. 3).

If desired, the various moving parts such as the sealing head, the conveyor and drive chains may be enclosed by suitable casing members or shields to prevent injury to the operator and to prevent foreign matter from impairing the operation of these parts.

*Another embodiment*

In Figs. 9 to 15 another sealing machine is illustrated which embodies the present invention but is simplified in construction and is provided with additional improvements for increasing the effectiveness of the machine. The modified machine comprises a base 150, a table 151 supported by the base, a conveyor 153 for delivering containers, a pair of spaced columns 152 extending upwardly from the base and a sealing head 154 having a frame 155 (Fig. 10) slidably mounted on the columns 152.

Figure 10:
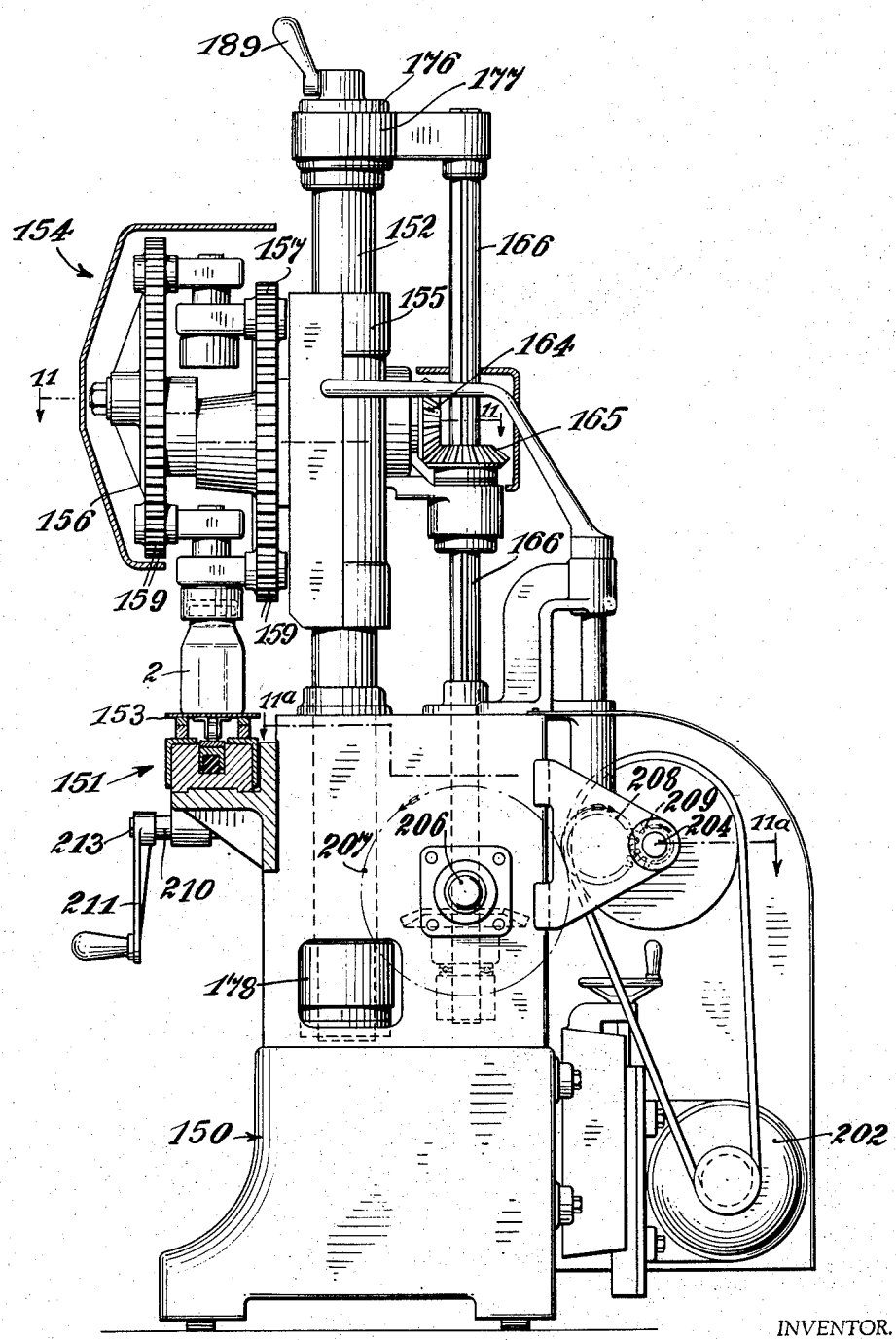
Fig. 10 is a side elevational view, partly in section, of the machine shown in Fig. 9.
Figure 11:
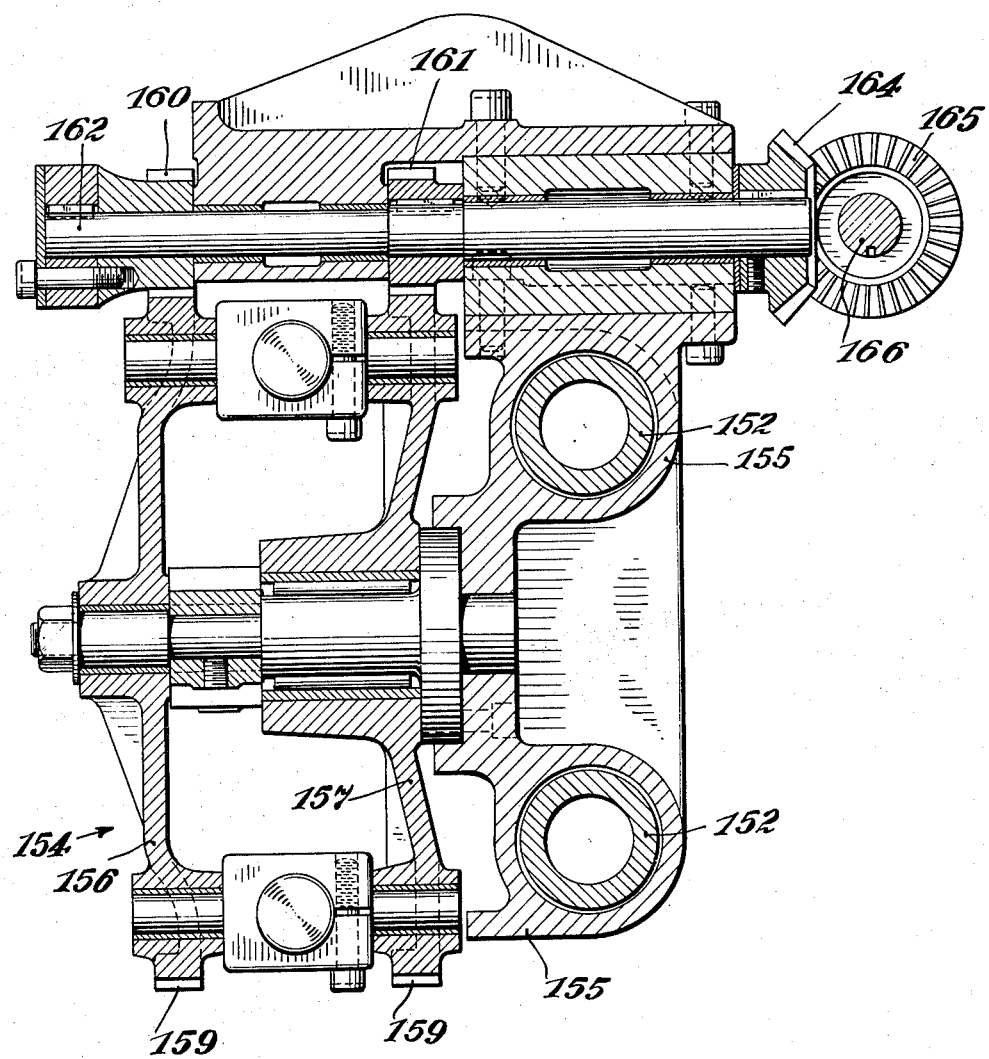
Fig. 11 is a sectional view taken along the line 11—11 of Fig. 10 illustrating the drive for the sealing head.
Figure 11A:
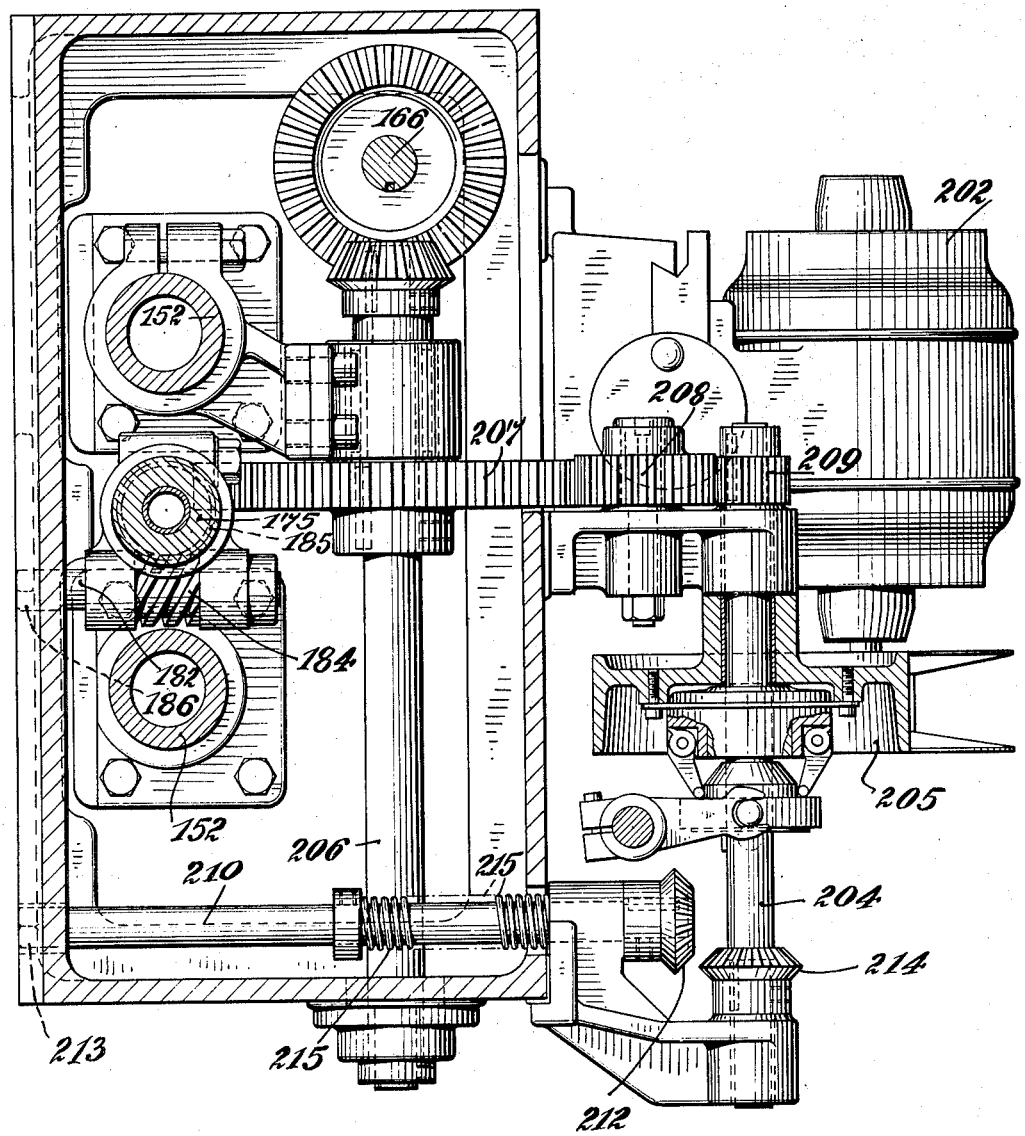
Fig. 11a is a sectional view taken along the line 11a—11a on Fig. 10.

The sealing head is illustrated in detail more particularly in Figs. 10, 11 and 11a and is provided with a front spider 156 and rear spider 157 for operating the sealing chucks. The spiders and chucks preferably are similar in construction and assembly to the corresponding parts of the preferred embodiment, but their operation is improved by providing the outer periphery of the spiders 156 and 157 with gear teeth 159 adapted to mesh with gears 160 and 161 respectively mounted on a shaft 162 carried by the sealing head frame (Fig. 11). The spiders, in this manner, are both positively driven by the gears on the shaft 162 to minimize relative movement of the spiders whereby the chucks are moved in accurate vertical alignment when they engage caps to seal them to containers. The shaft 162 preferably is rotated by a gear 164 which meshes with a gear 165 carried by the sealing head frame and is slidably keyed to a vertical drive shaft 166 (Fig. 10).

The sealing chucks preferably are provided with a device for positively forcing the caps out of the chucks after the chucks are moved past the sealing station (Fig. 12). Such a device preferably comprises an anvil member 167 slidably mounted in a chuck sleeve 169 for pressing the cover part of the cap downwardly and a spring member 170 for normally holding the anvil downwardly and permitting it to yield upwardly when the chuck is applied to seal the cap, as shown at A (Fig. 12). While the spring member 170 may be utilized to move the anvil to eject the caps, this is not practical because the spring must exert about two hundred to two hundred and fifty pounds pressure to insure ejection of caps jammed in the chuck. The downward pressure on the container necessary to compress the spring, in addition to the downward pressure normally exerted by the anvil to seal the cap, increased the total pressure on the containers to such an extent that containers were frequently broken.

To eliminate this difficulty, the present spring 170 is relatively weaker than the springs used heretofore and the anvil is provided with a stem 171 carrying a roller 172 at its upper end for engaging a cam 173 or the like mounted on a bracket 174 secured to the sealing head frame. The cam is adapted to positively hold the anvil downwardly while the crimping sleeve or chuck move upwardly with respect thereto to eject the cap after the chuck passes the sealing station as shown at B (Fig. 12). In this manner, the containers are not subjected to excessive downward pressure by the anvil 167 in the chuck and the caps are ejected from the chucks in a convenient manner.

In order to raise and lower the sealing head to accommodate containers varying in height, the lower end of a threaded vertical rod or shaft 175 is journalled in the base at 178 (Fig. 10), and the upper end thereof is fitted into a bushing 176 carried by a bracket member 177 supported by the columns 152. The threaded shaft 175 extends through a threaded nut or collar 179 for supporting a bracket 180 (Fig. 13) secured to the sealing head frame, which upon rotation of the shaft 175, is adapted to be raised or lowered. Preferably, the shaft 175 is rotated by a shaft 182 having a gear 184 meshing with a gear 185 on the vertical shaft 175 (Fig. 11a). The shaft 182 extends transversely with respect to the shaft 175 and has an arbor portion 186 at the front end thereof (Fig. 9) for receiving a suitable crank or handwheel (not shown). To prevent accidental rotation of the shaft 175 after the height of the sealing head has been adjusted, the bushing 176 may be split and provided with a clamping screw 189 adapted to be released to permit rotation of the shaft 175 to adjust the height of the sealing head and adapted to be tightened during the operation of the machine.

In order to permit upward movement of the sealing head in the event a container offers excessive resistance to the downward movement of the chucks by reason of its being too high or off center, the sealing head is connected to the height adjusting nut 179 by a safety latch device (Fig. 13) similar to the device shown in Figs. 6 and 6a. This safety device comprises a lower collar member 191 slidably mounted on the rod 175 and secured by bolts 193 to the sealing head bracket 180, an upper collar member 192 also secured to the bracket 180 and slidably mounted about the threaded rod or shaft 175 for limiting upward movement of a sleeve 194 slidably mounted on the rod 175, and a spring member 195 seated on the lower collar member 191 adapted to urge the sleeve 194 upwardly against the upper collar member 192. The nut or collar 179 is adapted to support the lower collar member 191 secured to the bracket 180 to support the sealing head and is operatively connected to the slidable sleeve 194 by means adapted to permit the bracket to move upwardly. To accomplish this, the latch members 196 are pivotally mounted on the nut or collar 179 and have rollers 197 at their ends adapted to fit into a groove or recess 198 formed in the sleeve 194. During normal operation of the machine the rollers are retained in inwardly extending position by a spring 199 to lock the sleeve 194 with respect to the nut 179 and cause the spring 195 to hold the lower collar member 191 downwardly against the nut 179. When the sealing head is moved upwardly an appreciable distance the latch members 196 spread and disengage the groove 198 to permit free upward movement of the bracket 180 carrying the upper and lower members 192 and 191. After the cause of the upward movement of the head has been removed, the bracket 180 slides downwardly by gravity until the lower collar member 191 is again supported by the nut 179. To impede the downward movement of the head and prevent damage of the parts, the lower end of the sleeve 194 is provided with a downwardly and inwardly flared cam surface 201 adapted to spread the latch members 196 outwardly in opposition to the spring 199. Thereafter the rollers 197 seat in the groove 199 and lock the bracket with respect to the adjusting nut 179.

Figure 9:
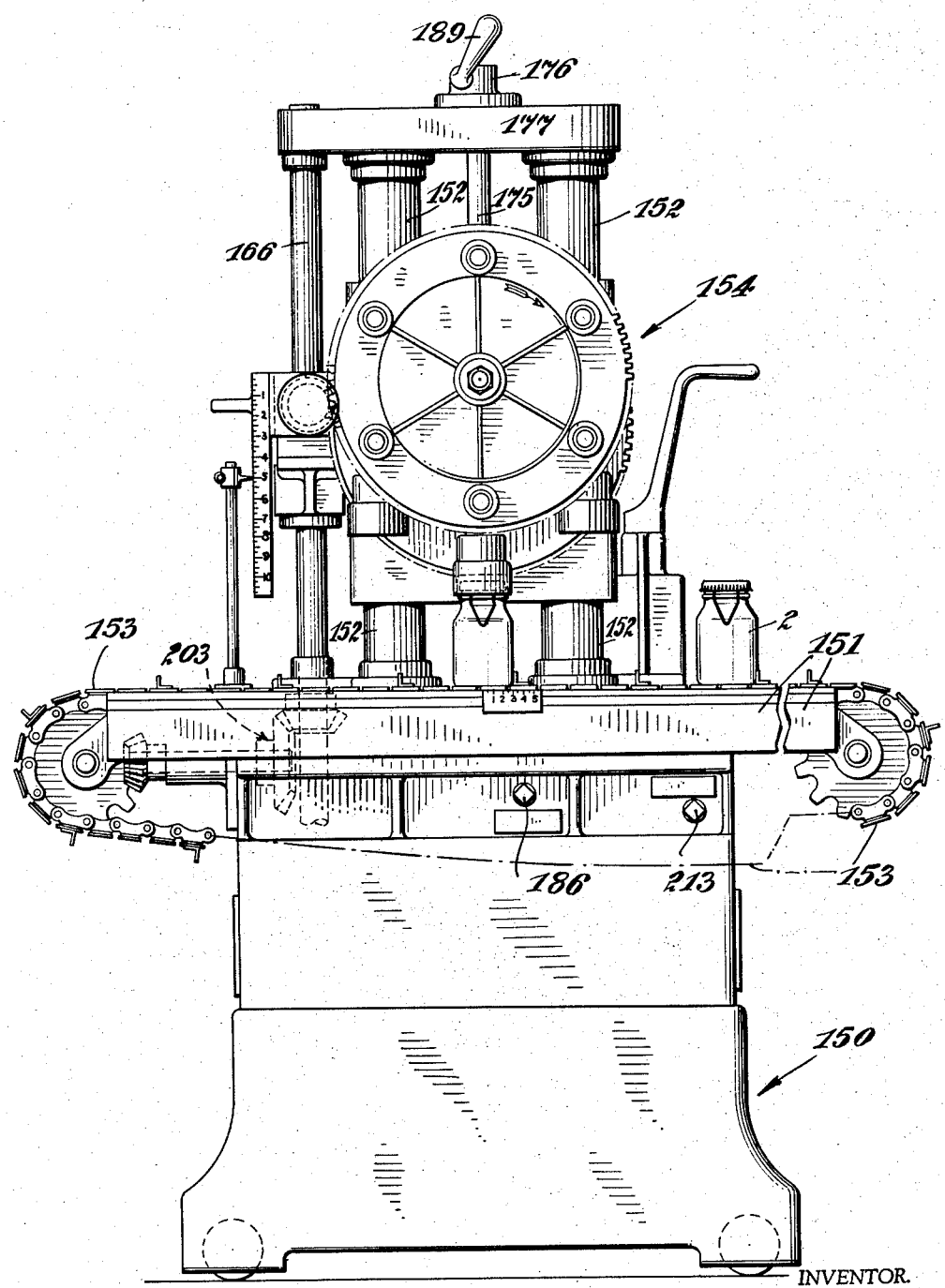
Fig. 9 is a front elevational view of a sealing machine illustrating another embodiment of the invention.

The drive for the modified embodiment preferably comprises a motor 202 mounted on the base of the machine, a main drive shaft 204 operatively connected to the motor by a clutch mechanism 205, a horizontal drive shaft 206 geared to the vertical shaft 166, and speed reducing gears 207, 208 and 209 for connecting the horizontal drive shaft 206 to the main drive shaft 204. A suitable mechanism 203 for moving the conveyor 151 adapted to present containers to the sealing head may be operatively connected to the vertical drive shaft 166 (Fig. 9).

In order to permit the machine to be turned by hand, a shaft 210 (Fig. 11a) is rotatably mounted in the base of the machine. This shaft has one end thereof extending outwardly at the front of the machine to provide a portion 213 for securing a crank or handle 211 and has a gear 212 at its other end adapted to mesh with a gear 214 on the main drive shaft 204. Preferably, the shaft 210 is slidably mounted so that it can be moved inwardly to cause the gears 212 and 214 to mesh when hand rotation of the machine is desired and a resilient member such as a spring 215 is adapted to hold the gears out of meshing relation during the operation of the machine.

The modified container feeding devices

Figure 14:
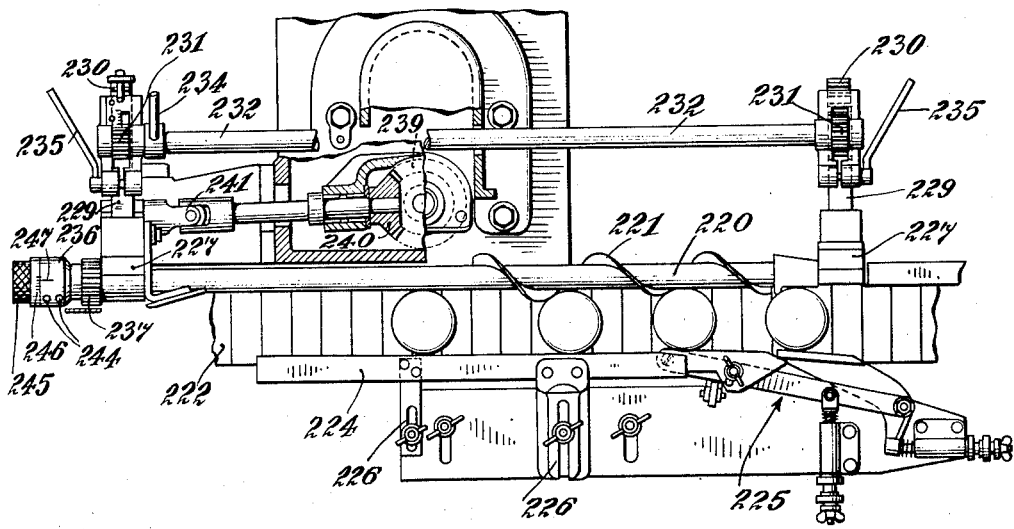
Fig. 14 is a top plan view of another device for delivering the containers to the sealing mechanism.

In Fig. 14 a modified device is shown for delivering the containers in timed relation to the sealing head, which is adapted to be used in conjunction with the sealing machine illustrated in Figs. 1 to 8 and the sealing machine illustrated in Figs. 9 to 13. This feeding device preferably comprises a helicoid such as a rotatable rod or shaft 220 having a helical or spiral thread 221 thereon adapted to move containers along a conveyor 222 in spaced relation, a guide bar 224 and a retarding mechanism 225 for holding the containers against the rotatable helicoid 220.

The guide bar 224 and helicoid 220 preferably are adjustable, transversely with respect to the conveyor to accommodate containers having different diameters and to center them with respect to the sealing chucks. To provide this adjustment, the guide bar is mounted on suitable bracket members 226, while the ends of the helicoid extend through bushings or collars 227 mounted on slidable brackets 229. In order to move the brackets 229 simultaneously and keep the helicoid shaft in parallel relation with respect to the conveyor, the brackets 229 are provided with gear racks, each adapted to mesh with a gear 231 mounted on a shaft 232 which may be rotated by a handle or lever 234. During the operation of the sealing machine, the brackets 229 are held against movement by clamps 235, but when it is desired to adjust the helicoid, these clamps are released and the handle 234 is moved to rotate the shaft 232 which rotates the gears 231 simultaneously to move both brackets 229 carrying the helicoid.

Preferably, the helicoid is rotated by a collar 236 secured to one end of the helicoid carrying a gear 237. The gear 237 is rotated by the vertical drive shaft 166 (Fig. 11) through gears 239 and 240, a universal connection 241 and suitable gears carried by the bracket members 229. The universal connection permits movement of the brackets 229 without unmeshing the gears for driving the helicoid.

The helicoid is also provided with an adjustment for moving the thread 221 into a predetermined relation with respect to the sealing station so that different sizes of containers may be brought into registry with the chucks. This adjustment is obtained by providing the collar 236 for rotating the helicoid with one or more set screws 244 adapted to be loosened to permit free rotation of the helicoid without rotating the drive. In order to rotate the helicoid to provide this adjustment, a knob 245 is secured to one end of the collar which has a gauge face 246 cooperating with an index mark 247 on the collar 236 to indicate the diameter of the container adapted to be fed to the sealing head.

Figure 15:
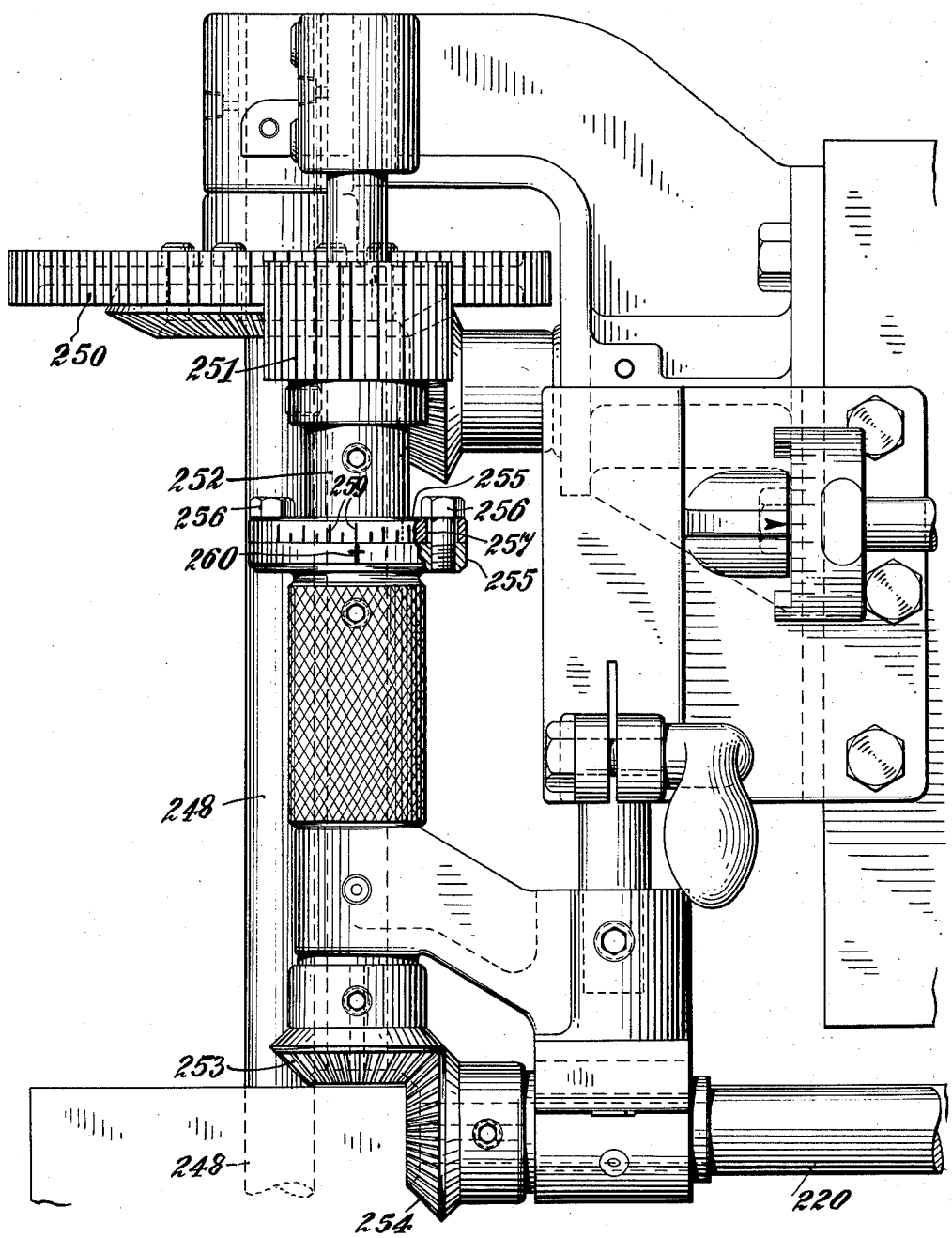
Fig. 15 is a top plan view of another mechanism for operating the container delivering device.

In Fig. 15 another helicoid feed device is illustrated which is driven by a shaft 248, adapted to drive a conveyor or a rotating takeoff table, through the intermediation of a gear 250 meshing with a gear 251 on a shaft 252 carrying a gear 253 meshing with a gear 254 at one end of the helicoid 220. In order to permit adjustment of the helicoid with respect to the conveyor without disturbing the drive connections, the gear 251 preferably is relatively wide so that it remains in meshing relation with the gear 250 when the brackets carrying the helicoid are moved.

The shaft 252 preferably comprises a pair of flanged shaft members 255 adapted to be connected to each other by suitable bolts 256. The bolts may be secured to one of the flanges and extend through circumferential slots 257 in the other flange to permit relative rotation between the ends of the shaft. In this manner, the shaft members may be disconnected and rotated independently of each other whereby the helicoid may be rotated independently of the drive to adjust the position of the thread with respect to the sealing head. In order to accurately determine the amount of relative circumferential movement of the shaft members, the flanges may be provided with a cooperating gauge face 259 and index means 260.

Operation of the machine

After the proper size sealing chucks have been secured to the sealing head spiders 80 and 81, the container guides 50 are adjusted for the diameter of the container to present them directly beneath the chucks and if the containers have an odd shape, it may be necessary to adjust the height of the guides 50 to prevent the containers from toppling over. The spring 56 of the retarding wiper 54 is then adjusted to provide the desired tension to position the containers against the conveyor cleats 24.

The sealing head is then raised by means of the handwheel 113 to permit about one-half inch clearance between a cap on a container and a sealing chuck when in its lowermost position. The handwheel 135 for turning over the main drive is rotated until the center line of the chuck registers with the center line of the sealing head as indicated by the arrow (Fig. 8) on the sealing head frame. When the head is in this position, the drive chain 29 is released and the handwheel 136 is rotated to move the conveyor 17 until a cap on a container is in vertical alignment with the chuck 15. After the parts are set in this relation, the drive chain is again connected to the shaft 26 and the head 14 is lowered until the pointer 111 indicates the height of the container on the scale 114.

The machine is now ready for operation, but preferably is first turned over a few times by hand to seal several containers and insure proper operation of the parts. If the seals formed are not satisfactory, it may be necessary to adjust the tension of the chuck springs, the safety latch spring 126 or the compensating spring 117 to apply the necessary pressure to the caps. The next step is to start the motor 130, throw in the clutch 131 and feed filled containers having caps seated thereon to the conveyor 17.

While the operation of the machine will be clear from the foregoing description, the following summary thereof may be helpful. The motor 130 drives the clutch 131, which drives the main drive shaft 31 through gears 134 and the sealing head spiders 80 and 81 are rotated by the gears 94 and 95, the shaft 92 and gears 90 and 91. Both the front and rear spiders are positively driven by the gear teeth 96 and 97 and the gears 98 and 99 on the shaft 100. The main drive shaft also drives the conveyor 17 through the sprocket 30, the chain 29, sprocket 27, axles 26 and the sprockets 25. The discharge disc 20 is rotated by the chain 61, sprockets 60 and 62, and gears 57 and 59 operatively connected to the conveyor sprocket axle 26.

As the containers move along the conveyor, they are placed against the cleats 24 by the retarding arm 54. At the right side in Fig. 8, a container 2 is shown as it approaches the vertical center line 148 of the sealing head and is about to be moved into alignment with the center line 149 of the chuck (Fig. 2). When the container reaches the center line 148 of the sealing head frame (Fig. 7) the bevelled portion 72 of the capping chuck engages the cap projections 9 and forces them downwardly and inwardly to seal the cap to the container while the chuck anvil 67 pressed downwardly on the cap to hold it in proper sealing position. At this point, the chuck exerts maximum sealing pressure and momentarily there is no relative linear movement between the chuck and cap due to the fact that they are moving at the same rate of speed in the same direction. After the cap is sealed, the container is moved past the center line 148 of the sealing head and the chuck is raised away from the cap, as shown at the left side of Fig. 8. As the succeeding container is presented by the conveyor, the succeeding chuck approaches the sealing station and seals the cap on the container. Due to the accurate adjustments between the conveyor and the chucks, the head and conveyor can be operated continuously at a relatively high speed.

If, during the sealing of the cap, the container offers excessive resistance due to the fact that it is slightly taller than the height for which the head is set, the compensating spring 117, the chuck spring 69, and the anvil cushion 45 are adapted to take care of such variations. However, if the increased resistance is too great, the safety latch releases the latch collar 119 (Fig. 6a) and the downward movement of the chuck pushes the entire sealing head frame upwardly until the container has passed through the sealing operation. Thereafter, the sealing head frame descends by gravity and the safety latch fingers snap into position to hold the head down (Fig. 6). When the head descends, the compensating spring acts as a shock absorber. Throughout the raising and lowering of the head, the shaft 92 carried by the sealing head bracket 101 rides within the gear 94 and does not interrupt rotation of the sealing head spiders 80 and 81.

After the containers have been sealed, the conveyor delivers them to the guides 19 which remove them from the conveyor and place them on the discharge disc 20.

It will be seen that the present invention provides an improved machine for continuously sealing caps to containers with chucks for reforming the caps to provide more secure seals. The entire operation of the machine is automatic and continuous and complicated devices for intermittent or step by step movement are eliminated. Oversize containers will not interfere with the operation of the machine because if the cap or the container offers too much resistance, the sealing head is raised and moves back into position for the next sealing operation. In this manner, containers will not be broken causing glass and other debris to be deposited on the machine which necessitates stopping the machine to wipe it away. The sealing head and conveyor can be accurately adjusted without guesswork and remain in their adjusted position throughout the operation. The chucks can be easily changed and replaced by other chucks for sealing caps of a different size or type. For example, they could be provided with chucks for applying downward pressure on the cover part of the cap without reformation of the cap. Also, the chuck connections are not subjected to excessive wear and will always be in perfect alignment with the cap to be sealed. The machine is rugged in construction and can readily withstand any rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a sealing machine the combination of a sealing head having a member mounted thereon for rotation in a vertical plane, a plurality of chucks on said member for sealing closure caps to containers, means for supporting said sealing head, and a latch device adapted to normally lock said sealing head to said supporting means and adapted to permit said sealing head to move upwardly with respect to said supporting means when a container offers excessive resistance to one of said sealing chucks.

2. In a sealing machine the combination of a column, a sealing head having cap applying chucks, said sealing head being slidably mounted on said column, means associated with said column for supporting said sealing head, and means adapted to normally lock said sealing head to said supporting means and adapted to release said sealing head to permit upward movement thereof when excessive resistance is offered to one of the cap applying chucks.

3. In a sealing machine the combination of a column, a sealing head having cap applying chucks, said sealing head being vertically slidable with respect to said column, means associated with said column for supporting said sealing head, means for adjusting the height of said supporting means to determine the position of said head with respect to said column, and means for normally locking said sealing head to said supporting means and for releasing said sealing head to permit upward movement thereof when excessive resistance is offered to one of the cap applying chucks.

4. In a sealing machine the combination of a sealing head having cap applying chucks, a column for slidably mounting said sealing head, means associated with said column for supporting said sealing head, and means for normally locking said sealing head to said supporting means and for releasing said sealing head to permit upward movement thereof when a cap on a container offers excessive resistance to one of the cap applying chucks, and means carried by said sealing head for operatively connecting said sealing head to a drive and permitting upward and downward movement of said sealing head without disconnecting said drive therefrom.

5. In a sealing machine the combination of a sealing head, a normally stationary member for supporting said sealing head, a member slidably mounted on said sealing head having a shoulder, and latch members on said supporting member adapted to normally engage the shoulder of said slidable member and lock said sealing head to said supporting member.

6. In a sealing machine the combination of a sealing head, a member for supporting said sealing head, a collar slidably mounted on said sealing head having a shoulder, a spring member for urging said collar upwardly, and latch fingers on said supporting member adapted to normally engage the shoulder of said collar and lock said sealing head to said supporting member.

7. In a sealing machine the combination of a sealing head, a member for supporting said sealing head, a collar slidably mounted on said sealing head having a shoulder, spring means for urging said collar upwardly, latch fingers on said member adapted to normally engage the shoulder of said collar and lock said sealing head to said supporting member, and resilient means for holding said fingers in position to engage the shoulder of said collar.

8. In a sealing machine the combination of a sealing mechanism having a bracket for connecting it to a supporting column, an upright column for supporting said sealing mechanism, a threaded member for connecting said bracket to the supporting column and for adjusting the height of said sealing mechanism with respect to a conveyor, a conveyor for presenting containers to said sealing mechanism, means associated with said column and said sealing mechanism to indicate the height of the containers for which the sealing mechanism is adjusted, and resilient means associated with said bracket and said threaded connecting member for securing said sealing mechanism to said column adapted to compensate for deviations from the height of the containers for which the sealing head is adjusted.

9. In a device of the class described, the combination of a rotatable member adapted to rotate in a vertical plane, a sealing tool operatively connected to said rotatable member and adapted to be moved downwardly and upwardly by said rotatable member to reform the skirt of a closure cap and seal it on a container, a slidable member in said tool adapted to engage the top of the cap and hold it on the container while reforming tool is effective, and cam means in the path of said slidable member for holding the slidable member downwardly when said tool is moved upwardly.

10. In a device of the class described, the combination of a rotatable member adapted to rotate in a vertical plane and to move a sealing tool upwardly and downwardly, a tool operatively connected to said rotatable member having a portion adapted to be telescoped over a closure cap to reform the skirt thereof, a slidable member in said tool adapted to engage the top of a cap to hold the cap on a container while the reforming tool is effective, and a stationary cam adjacent said rotatable member and in the path of said slidable member for holding said slidable member downwardly while said tool is moved upwardly to eject the cap from said reforming tool.

11. In a device of the class described, the combination of a rotatable member adapted to rotate in a vertical plane and to move a sealing tool upwardly and downwardly, a tool operatively connected to said rotatable member having a portion adapted to be telescoped over a closure cap to reform the skirt thereof, a slidable anvil member associated with said tool adapted to engage the top of the cap and hold it downwardly on a container while the reforming tool is effective, resilient means for normally urging said anvil member downwardly, and a stationary cam in the path of said anvil member for holding said anvil member downwardly until said tool has been moved out of engagement with the cap.

12. In a sealing machine the combination of a sealing head adapted to rotate in a vertical plane, a plurality of chucks on said sealing head adapted to reform the skirt of a closure cap to seal it on a container, each of said chucks having a member slidably mounted therein for holding the cap on the container while the chuck is effective to reform the cap, means for presenting containers to said sealing head in timed relation with the operation of said sealing head, and stationary means associated with said sealing head adapted to hold said slidable member downwardly while said sealing head moves said chucks out of engagement with the caps sealed to the containers.

13. In a sealing machine the combination of a rotating sealing head adapted to apply caps to containers, a longitudinally extending spiral member adapted to present containers to said sealing head, supporting means at each end of said spiral member, means for simultaneously moving at each end substantially said supporting means the same distance with respect to said sealing head, and means for rotating said spiral member.

14. In a sealing machine the combination of a continuously rotating sealing head having chucks for sealing caps to containers, a spiral member adapted to present containers to said sealing head, a plurality of brackets for supporting said spiral member having a gear rack thereon, a shaft having gears thereon adapted to engage said gear racks to simultaneously change the position of said supporting brackets with respect to said sealing head, and means for rotating said spiral member.

15. In a sealing machine the combination of a continuously rotating sealing head having chucks thereon for applying caps to containers, a spiral member adapted to present containers to said sealing head, supporting means at each end of said spiral member, gear means cooperating with said supporting means for changing the position of said supporting means with respect to said sealing head to enable said spiral member to present different sizes of containers, gear means for rotating said spiral member, and a shaft provided with a universal joint operatively connecting said gear means to said spiral member to permit the position of said spiral member to be changed without rendering said rotating means ineffective.

16. In a sealing machine the combination of a rotating sealing head, a spiral member adapted to present containers to said sealing head, brackets for supporting said spiral member, means for changing the position of said supporting means with respect to said sealing head, a gear carried by one of said brackets for rotating said spiral member, and a second gear for rotating said first gear, said gears being slidably mounted with respect to each other and one of said gears being wider than the other to permit the position of said brackets to be changed while said gears remain in meshing relation.

17. In a sealing machine, the combination of a column, a sealing head having a cap applying chuck connected thereto, said head being slidably mounted on said column, means associated with said column for supporting said sealing head, and means adapted to normally lock said sealing head to said supporting means and adapted to release said head to permit upward movement thereof when excessive resistance is offered to said cap applying chuck.

18. In a sealing machine, the combination of a rotatable member adapted to rotate in a vertical plane, a plurality of sealing chucks on said rotatable member, a column for supporting said rotatable member, a bracket for slidably mounting said rotatable member on said column, means associated with said column for supporting said bracket, and means adapted to normally lock said bracket to said supporting means and adapted to release said bracket to permit upward movement thereof when excessive resistance is offered to one of said cap applying chucks.

19. In a sealing machine, the combination of a sealing head adapted to rotate in a vertical plane, a sealing chuck on said sealing head adapted to reform the skirt of a closure cap to seal it on a container, said chuck having a member slidably mounted therein for holding the cap on the container while the chuck is effective to reform the cap, means for presenting containers to said sealing head in timed relation with the operation of said sealing head, and stationary means associated with said sealing head adapted to hold said slidable member downwardly while said sealing head moves said chuck out of engagement with the cap sealed to the container.

20. In a sealing machine the combination of a sealing head having means for sealing a closure cap to a container, means for supporting said sealing head, and latch means normally locking said sealing head to said supporting means including a latch member pivotally secured adjacent one end thereof to said supporting means and having a projecting portion thereon adapted to engage a movable collar member, a movable collar adapted to be normally retained in position by the projecting portion on said latch member, a spring positioned intermediate a portion of the sealing head and said movable collar for urging said sealing head downwardly against said supporting means while said latch means are in locking position, said latch means being adapted to be released to permit upward movement of said sealing head with respect to said supporting means when a container offers execessive resistance to said sealing means.

21. In a sealing machine the combination of a sealing head, a member for adjustably supporting said sealing head so as to receive and seal different sizes of containers, a member extending about said adjustable supporting means having a shoulder adapted to normally engage with a latch finger and movable with respect to said supporting means when the sealing head is subjected to an excessive force, a pair of latch fingers pivotally mounted on a member extending about said adjustable supporting member and adapted to normally engage said shoulder, and resilient means for normally urging said fingers inwardly towards each other to engage said shoulder and to lock said sealing head to said supporting member.

22. In a sealing machine, the combination of a continuously rotated sealing head adapted to rotate in a vertical plane having a plurality of sealing chucks, a table beneath said sealing head, a screw member having a pitch adapted to feed containers across said table in timed relation with respect to the operation of said chucks, means for rotating said screw member in timed relation with said sealing head, and a resiliently actuated, pivotally mounted arm at one side of said table having means associated therewith for adjusting said arm and with a portion of said arm normally extending into the path of movement of containers on said table adapted to momentarily retard the movement of said containers to assist in maintaining them in contact with the container feed portions of the screw conveyor.

23. In a sealing machine, the combination of a sealing mechanism, a conveyor for delivering containers to said sealing mechanism having friction reducing means on the underside thereof, a table for supporting said conveyor having a runway therein extending longitudinally beneath a portion of said conveyor, a vertically movable plate mounted in said runway and supporting the friction reducing means at the underside of the conveyor, and resilient means at the lower part of said runway supporting said vertically movable plate, said resilient means being adapted to yield slightly to permit movement of said plate and minimization of excessive strains on a container and the conveyor parts while the sealing chucks are effective to seal a container.

ABRAHAM PODEL.